(12) United States Patent
Bishop et al.

(10) Patent No.: US 6,263,123 B1
(45) Date of Patent: Jul. 17, 2001

(54) PIXELLATED WDM OPTICAL COMPONENTS

(75) Inventors: David J. Bishop, Summit; Clinton R. Giles, Whippany, both of NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/267,848

(22) Filed: Mar. 12, 1999

(51) Int. Cl.[7] ...................................... G02B 6/42
(52) U.S. Cl. ................... 385/15; 385/18; 385/19; 385/24; 385/37; 359/124; 359/127
(58) Field of Search .................... 385/15, 18, 19, 385/24, 37; 359/124, 127

(56) References Cited

U.S. PATENT DOCUMENTS

| | | | |
|---|---|---|---|
| 5,745,271 | * | 4/1998 | Ford et al. ............................ 359/130 |
| 5,960,133 | * | 9/1999 | Tomlinson ............................. 385/18 |
| 6,097,859 | * | 8/2000 | Solgaard et al. ....................... 385/17 |

* cited by examiner

*Primary Examiner*—Hemang Sanghavi
*Assistant Examiner*—Sung Pak

(57) ABSTRACT

A micromirror array is used to form optical apparatus useful in WDM optical networks. In one embodiment, the micromirror array is used to insert a desired attenuation in individual channels for purposes such as equalization. In another embodiment, the micromirror array is used to form an optical monitor useful as an optical spectrum analyzer.

9 Claims, 2 Drawing Sheets

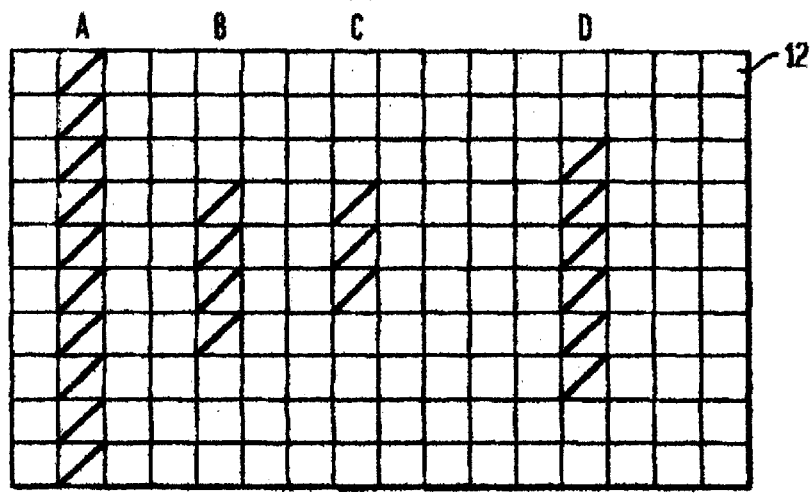
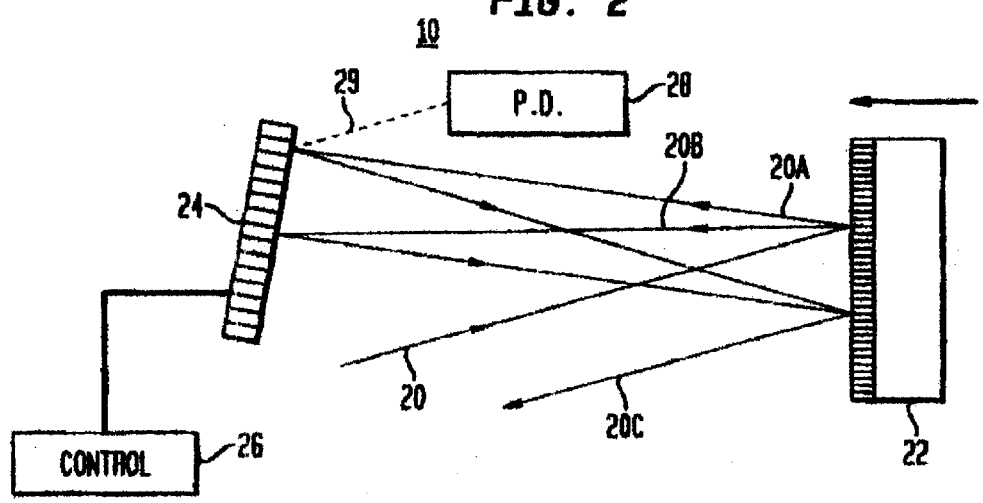
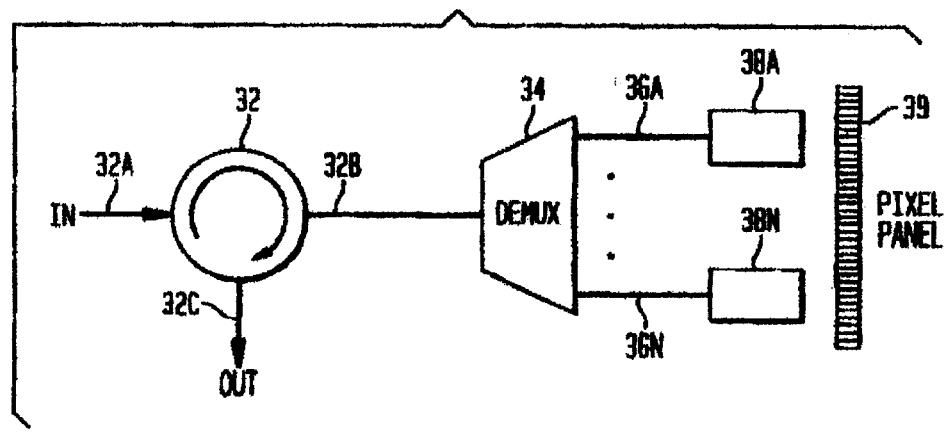

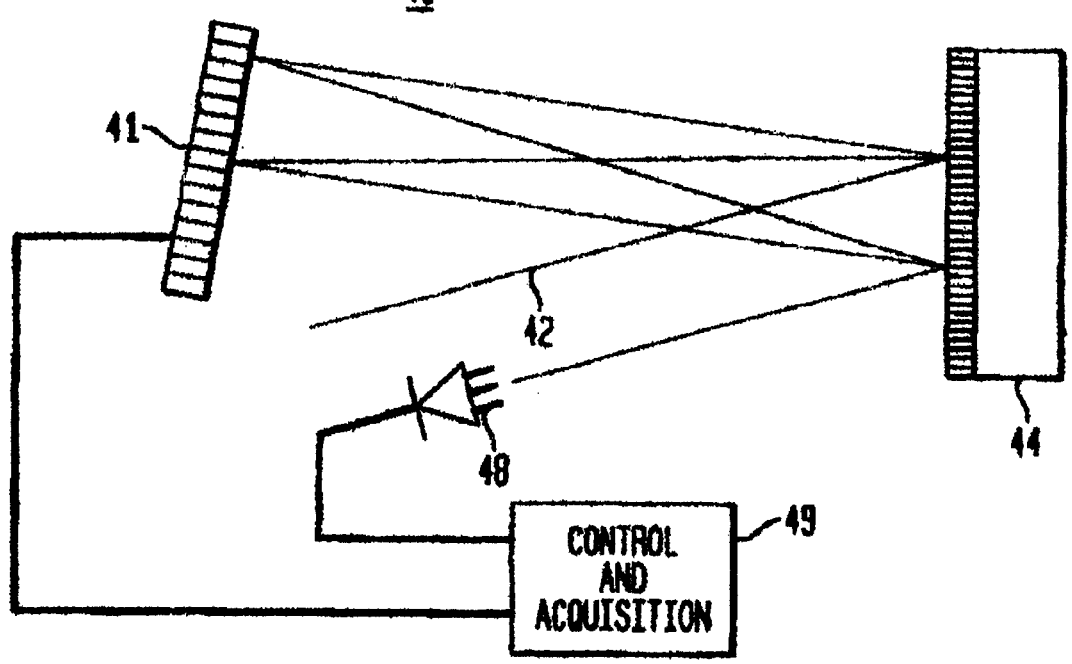

PIXELLATED WDM OPTICAL COMPONENTS

FIELD OF THE INVENTION

This invention relates to optical components, particularly optical components for use in wavelength division multiplexed (WDM) optical networks.

BACKGROUND OF THE INVENTION

The growing importance of wavelength division multiplexing (WDM) has exerted a need for a variety of optical components for various functions important to the quality of such networks.

In particular, in WDM optical networks it may be necessary to provide equalizers to compensate for differences in signal power levels in the multiple channels of a WDM transmission system. Such differences may arise, for example, because of loss variations or non-linear effect in optical fibers or non-flat gain spectra in optical amplifiers. Moreover, in optical networks, signals originating from different modes or taking different paths may need to be combined at some point and so require adjustment or equalization in their power levels. An example of equalization of multiple channels of a WDM transmission system is described in U.S. Pat. No. 5,745,271 that issued on Apr. 28, 1998 to J. E. Ford, D. A. B. Miller, M. C. Nuss and J. A. Walker.

Equalizers can also be used at WDM transmitter locations to provide channel equalization, or pre-emphasis, before the signals are launched into the transmission system. WDM equalizers could also be useful in optical network components, such as a cross-connect where signal equalization might improve cross-talk and signal-to-noise ratios.

Also important in a WDM optical network is the optical monitoring function to monitor optical spectra, particularly as the number of channels increases, wavelength tolerances narrow, and systems evolve towards all-optical networks.

Of increasing interest for such functions has been the use of micromechanical optical devices because of potential greater ruggedness, longer life and lower costs that such devices promise. Such devices show great promise in applications where the action is not especially wavelength dependent, as for example in the control of the total power level of a multichannel signal rather than of individual components.

There currently are available optical components that have been developed for use in video and computer projections that comprise two-dimensional arrays in horizontal rows or vertical columns of single-axis tilting digitally (bistable) settable micromechanical mirrors, such as the Digital Micromirror Device (DMD). These have been commercialized for use in video and computer projection systems in large arrays (greater than 800×600 pixels). Each pixel in the array, for example, may comprise a 16×16 micron aluminum-coated mirror that is separately addressable and can be tilted, for example, plus or minus ten degrees electronically. The pixel spacing may be 17 microns, resulting in an overall fill factor of about ninety percent. Moreover, it appears likely that further improvements will be forthcoming that will permit smaller size with similarly tight packing.

SUMMARY OF THE INVENTION

The present invention is based on the use of a two-dimensional micromirror array, for example, of the kind described. In particular, for controlled attenuation of components of a multiwavelength optical signal, such as particular channels of a WDM optical signal, the multiwavelength signal is supplied to a dispersive element, such as a prism, diffraction grating, or arrayed waveguide grating router (AWGR) that separates spatially the different wavelength components and provides a unique direction for each. A micromirror array of the kind described is positioned in the paths of the separated wavelength components such that the components of different wavelengths are incident on different portions of the micromirror array. By adjusting appropriately the number of mirrors in each of said different portions whose tilt is such as to transmit or redirect its incident light in a selected direction, there is controlled the incident light of a particular channel that is directed in the selected direction. Advantageously, by appropriate adjustment of the tilt, all the light redirected in the selected direction can be combined in a single output signal by the same dispersive element initially used to separate the input signal into the different wavelength components. Alternatively, the redirected light can be combined in a single output signal by a separate dispersive element.

Advantageously, the mirrors in the panel are arrayed in essentially horizontal rows and vertical columns, and each component signal is directed to be incident on a selected different column (row), or group of columns, of the array and the attenuation provided is controlled by a number, and thus the area of mirrors in such selected column (row) or group whose tilt is such that the incident light is not transmitted or reflected in a direction to be successfully combined in the output signal. It should be apparent that the light can be dispersed either to separate horizontally or vertically by the choice of orientation of the dispersive element. To simplify the discussion, it will be assumed hereafter that the different wavelength components are displaced in a horizontal direction to be incident on different vertical columns of mircromirrors with the understanding that by a ninety degree rotation a column becomes a row. It would also be advantageous if each component is spread a uniform amount in the vertical direction to utilize a large number of pixels in each vertical column so that the amount of light reflected in the selected direction is primarily dependent on the number, and thus the area of mirrors appropriately tilted in the column on which the light is incident.

It can be appreciated that because there can be available hundreds of columns, a large number of wavelength channels can be accommodated. In particular, in many cases, there will be sufficient columns to permit each channel to use a plurality of adjacent columns to reduce the waste of signal power. Moreover, because there also can be hundreds of rows, there can be hundreds of pixels in each column that are available for use so that the attenuation level introduced can be controlled with a continuous fine grain structure, even though each pixel is only digitally settable. Moreover, because of the large number of mirrors that can be assigned to each channel, the failure of a few mirrors would have little affect on the operation, and so be tolerable.

Additionally the alignment of the mirror columns and rows can be arranged to compensate for aberrations in the dispersive element or included optics that distort the shape of the beam that is incident on the panel.

In a different application, a micromirror array of the kind described can be used to form an optical monitor for use in a WDM optical network acting as spectrum analyzer to measure the optical power spectrum of the WDM, channel by channel, allowing determination of signal power, signal bandwidth noise spectrum, and signal-to-noise-ratio (SNR).

For such application, a multiwavelength optical signal, such as a WDM optical signal, is again supplied to a dispersive element for separating spatially the various channels and the dispersed components are made incident on a micromirror array of the kind described, so that the optical spectrum is dispersed across the plane formed by the micromirror array. In this application, the mirrors are operated so that at any one instant, only mirrors in a single column, or single unique group of adjacent columns corresponding to one channel of the array, are tilted to reflect the light in a chosen direction and this reflected light of each channel is collected in turn to provide an electrical signal whose amplitude can be recorded or displayed as a measure of the power level of the channel or wavelength accessed at the corresponding time. Because of the large number of possible columns available, fine grain resolution can be achieved. In some instances, it may be desirable to direct for detection only a known fraction of the signal to permit the use of the undetected portion for useful signal transmission.

It can be appreciated that here also by a change of 90° in orientation a column becomes a row and a row a column so that the terms are interchangeable.

Moreover, it should be feasible to substitute for the two-dimensional arrays of micromirrors such as to utilize in similar fashion two-dimensional arrays of other forms of microelements whose transmissivity in a desired direction can be controlled by controlling the transmission properties to incident light, to be either absorbing or transmitting.

The invention will be better understood from the following more detailed description taken in conjunction with the accompanying drawing.

BRIEF DESCRIPTION OF THE DRAWING

FIG. 1 is a schematic drawing showing a portion of a tiltable micromirror array of the kind preferably used in the invention.

FIG. 2 shows schematically a free space arrangement using a tiltable micromirror array of the kind of FIG. 1 for introducing individually-controlled attenuation in different wavelength channels of a WDM optical network, as one illustrative embodiment of the invention.

FIG. 3 shows an alternative channelized arrangement for performing a similar attenuation process, and is illustrative of another embodiment of the invention.

FIG. 4 shows the micromirror array of FIG. 1 included in an optical monitor for use as a power spectrum analyzer in a WDM optical network, as another illustrative embodiment of the invention.

DETAILED DESCRIPTION

With reference now to the drawing, in FIG. 1, there is shown schematically a portion of a tiltable micromirror array panel 10 of the kind for use in the invention. In the panel, each square 12 represents a mirror (pixel), typically about 16 microns square, although the size can vary over a wide range, larger and smaller. The mirrors advantageously are arranged in horizontal rows and vertical columns to form a two-dimensional rectangular array. The mirrors are spaced apart to have a center-to-center spacing both in the horizontal and vertical directions, typically of about 17 microns, although in the drawing for the sake of simplicity, the mirrors are shown packed with no spacing. The tilt of each mirror can be individually controlled by an electrostatic control panel (not seen), typically positioned behind the mirrors, that addresses individual mirrors. Suitable circuitry (not shown) is included to control dynamically the tilt of individual mirrors. Typically each mirror can be tilted either plus or minus ten degrees with respect to a normal to the plane of the panel. In the figure, the difference in states between mirror tilts is indicated by the slanted line 14 to indicate mirrors with a tilt to favor scattering in the non-selected direction. In this system an input multiwavelength optical signal has its components of different wavelength dispersed different amounts in a horizontal direction so that signals of different channels are incident on different vertical slices, or columns, of the mirror plane so that each channel is affected by the number of mirrors that are of the appropriate tilt at its particular column or group of columns. If only the mirrors shown tilted are oriented to return the incident light rather than scatter it, the signal channel incident on the column labeled A of the mirrors would be most attenuated, while the signal channel incident on the column labeled C would be least attenuated, if it is assumed that each of the channel signals is made to have an essentially uniform full vertical height as it is incident on the panel.

In FIG. 2 there is shown a top view of the basic arrangement used to introduce different amounts of attenuation for purposes of equalization. To simplify the drawing, only two different wavelength channels 20A, 20B of an input WDM signal 20 are shown incident on a dispersive element, such as a prism or a diffraction grating 22, that separates the input multiwavelength signal 20 into the two channels 20A, 20B for incidence on the micromirror array panel 24, essentially of the kind shown in FIG. 1, in which the light of channel 20A is made incident, for example, along column A of the micromirror array and the light of channel 20B is made incident along column B of the micromirror array. After reflection in the selected direction from the micromirror array 24, back into the dispersive element 22, the two signals 20A and 20B are recombined and exit as an output two-channel WDM signal 20C. Of course, the input signal typically would have been a WDM signal of considerably more than two channels. Adjustment of the tilt of the individual mirrors of the panel 24 is controlled by suitably programmed control circuitry 26. In a more complex arrangement, it also should be advantageous to include suitable optics, for example, intermediate between the dispersive element 22 and the micromirror array to spread each light beam in a vertical direction to extend its height before it is incident on the micromirror array, the better to utilize the height of the mirror column, and to condense each reflected light beam vertically after it is reflected from micromirror array. This would make it easier for the input light signal initially to be a narrow beam provided by an input optical fiber and to be collected after equalization as a narrow beam in a single output fiber.

Additionally, provisions can be made to capture the light that is scattered rather than returned, after incidence on the micromirror array, if use is to be made of such scattered light. For example, a photodetector 28 can be positioned to capture light that has not been redirected in the direction for recombining to provide a measure of the intensity of the light in that channel for various monitoring purposes. In such a system, a separate photodetector can be provided for each channel to be monitored.

Since each wavelength component can be made to impact a large number of mirrors, or pixels, even if each pixel is only digitally-settable, fine grain, near continuous, adjustment of attenuation is possible. The optical configuration is very adaptable, and so it allows for continuous adjustment over the whole spectrum of channel wavelengths. Moreover, because of the large number of pixels that are available for each channel component, the reliability of the apparatus can be high, since failure of few pixels on the array would have little impact on overall performance. In a typical mirror array of 500,000 pixels, each channel of a hundred channel WDM system could easily have available at least 1,000 pixels to provide at least 1000 possible levels of equalization.

An application Ser. No. 08/968,935 was filed on Nov. 12, 1997 (Aksyuk et al. 5-11-18-47) having the same assignee as the instant application and including a common inventor. This application discloses a wavelength division multiplex add/drop device using a dispersive element to separate channels of a WDM signal and to direct separate channels to individual mirrors in the row for selective reflection back to the dispersive element, and its teaching is incorporated herein by reference.

FIG. 3 shows another version of a WDM equalizer using a micromirror array panel that includes optics to provide collimation of the dispersed beams. A multichannel WDM optical signal 30 is supplied to port 32A of an optical circulator for exit at port 32B and entry into the input port of a demultiplexer 34, for example of the form known as an arrayed waveguide grating router (AWGR), that separates an input multiwavelength signal into individual channels, a different one at each different output waveguide, 36A–36N. The beam of each of these channels advantageously is separately shaped in one of the collimators 38A–38N so that each beam illuminates a vertical slice of the pixellated panel array 39 of the kind shown in FIG. 1, enabling near-continuous adjustment of the loss over a large dynamic range. Arrayed waveguide grating routers are typically made as planar lightwave circuits (PLC) with silica waveguides on silicon. Accordingly, it is feasible to fabricate lenses on such silica waveguides, or to attach a lens array at their ends, to collimate or shape the individual beams to form primarily one-dimensional vertical beams for incidence on the panel 39. The mirrors can be adjusted, essentially in the same manner as has been discussed with reference to FIG. 2, to reflect the portion of each light beam being reflected back to pass through the collimators 38 and the AWGR 34. Because of the reciprocal nature of the AWGR, the individual beams are now recombined into a single equalized beam that passes out through the input port of the AGWR and is supplied to port 32B of the circulator for exit at port 32C for continued travel.

It should be apparent that a wide variety of forms of optics can be devised for use with the pixel panel to implement similar modes of equalization.

The principles involved in the pixellated WDM optical equalizers can be used to implement other functions important in WDM optical networks. In FIG. 4 there is shown an arrangement 40 that uses a micromirror panel 41 of the kind described to implement a WDM optical monitor. The WDM optical monitor, acting as an optical spectrum analyzer, can be used to measure the optical power channel spectrum of the WDM signal for the determination of one or more of the signal power, signal bandwidth, noise spectrum, and signal-to-noise ratio.

As in the arrangement of FIG. 3, an input multichannel WDM optical signal 42 is made incident on a suitable dispersive element 44, such as a diffraction grating, to demultiplex the multichannel signal into the component channels signals that are made incident on different portions of the pixel panel 41. Now to measure the power level of the different channels of the whole spectrum that is dispersed across the pixel plane, at any instant in time only a single column or limited number of adjacent columns of mirrors, are tilted to redirect the incident light. The redirected light is collected by a suitable photo detector-amplifier 48 that converts the incident light into an electrical signal, advantageously with equally high efficiency over the whole spectrum involved. This electrical signal then is recorded and/or displayed by the control and acquisition apparatus 49 that also serves to control the tilt of the mirrors of the panel 41. Scanning across the pixel plane one column or a limited number of adjacent columns at a time under control of the acquisition and control circuitry 49 enables the whole spectrum of channels to be sampled one at a time. A time trace of the detected signal is a measure of the power level of the individual channels of the optical signal. High resolution is possible since the pixel panel can easily be made to have 1000 columns. This compares favorably with state of the art long-wavelength detector arrays, which are generally limited to about 256 detecting elements. Again, a high degree of redundancy is possible since each column can have hundreds of pixels. Finally, as the tilted mirrors are fast moving, lock-in detection methods can be used to improve signal detection and to minimize stray light effects. For example, the columns of mirrors can be vibrated to modulate the reflected light, which can then be detected using lock-in detection methods at the control and acquisition apparatus 49. Any stray light scattered from imperfections in the pixel plane or from other elements of the optical monitor described could be rejected or compensated for.

Moreover, as has been mentioned earlier, it should be feasible to utilize arrangements of the kind described in connection with FIGS. 2 and 3 also do monitoring functions by capturing the light that was not reflected back for recombination into a single output beam. Such deflected light for each channel can be separately collected in its own separate detector-amplifier for recording and/or display in suitable apparatus. Such collected light will be a measure of the instantaneous power level of the signal in such channel and can be used for control purposes.

It should be recognized that the invention can be extended to the use of panels in which the various pixel elements of the panel need not reflect the incident light to be recombined in a selected direction but can simply transmit the light in the desired direction, absorbing or scattering the light not to be so recombined. In such a case the pixel elements need not be micromirrors but might be similarly small microelements that can be made selectively transmissive or absorptive by an applied voltage.

What is claimed is:

1. Apparatus for inserting a controlled amount of attenuation in the power level of individual channels of a wavelength-division-multiplexed optical signal comprising:

a panel comprising a plurality of micromirrors that can be selectively tilted either to or not to reflect the incident light in a direction for recombination into the output beam, the plurality of micromirror being arranged in a two-dimensional array essentially a plurality of rows and a plurality of columns with at least one column exclusively for each channel of the signal and each column including a plurality of micromirrors, corresponding in numbers to the output levels to be provided;

means positioned to intercept an input wavelength-division-multiplexed input beam for separating the beam into individual channel beams, for directing the separate beams for incidence on separate columns of the micromirrors of the panel, and for recombining into the output beam the separate beams reflected in the desired direction; and means for controlling the number of micromirrors in each column tilted away from the direction for recombination into the output beam to control the attenuation inserted.

2. The apparatus of claim 1 in which each micromirror can either reflect incident light in the desired direction for recombination or scatter it.

3. The apparatus of claim 1 in which the means to intercept the input wavelength-division-multiplexed beam is a diffraction grating.

4. The apparatus of claim 1 in which the means to intercept the input wavelength-division-multiplexed beam is an arrayed-waveguide-grating router.

5. The apparatus of claim 1 in which the means to intercept the input wavelength-division-multiplexed beam is a prism.

6. The apparatus of claim 1 in which each column includes at least hundreds of micromirrors and each channel beam is made incident simultaneously on a plurality of micromirrors of a column.

7. The apparatus of claim 6 in which the means positioned to intercept the input wavelength-division-multiplexed signal spreads each channel beam a uniform amount in the direction of the columns.

8. The apparatus of claim 1 in which each channel beam is incident on a separate group of a plurality of columns of micromirrors.

9. The apparatus of claim 7 in which each separate group includes at least a hundred micromirrors and each beam is incident on a separate group of channels.

* * * * *